United States Patent
Price

(10) Patent No.: US 9,785,833 B1
(45) Date of Patent: Oct. 10, 2017

(54) SYSTEM AND METHOD FOR TEXTUAL NEAR-DUPLICATE GROUPING OF DOCUMENTS

(71) Applicant: Relativity ODA LLC, Chicago, IL (US)

(72) Inventor: Robert Jenson Price, Leesburg, VA (US)

(73) Assignee: RELATIVITY ODA LLC, Chicago, IL (US)

( * ) Notice: Subject to any disclaimer, the term of this patent is extended or adjusted under 35 U.S.C. 154(b) by 0 days.

(21) Appl. No.: 15/088,347

(22) Filed: Apr. 1, 2016

Related U.S. Application Data

(60) Provisional application No. 62/309,767, filed on Mar. 17, 2016.

(51) Int. Cl.
    *G06K 9/68* (2006.01)
    *G06K 9/00* (2006.01)
    *G06K 9/62* (2006.01)

(52) U.S. Cl.
    CPC ..... *G06K 9/00483* (2013.01); *G06K 9/00456* (2013.01); *G06K 9/00463* (2013.01); *G06K 9/6215* (2013.01)

(58) Field of Classification Search
    CPC ....... H04N 2201/0081; G06K 9/00442; G06K 9/00463; G06K 9/00483
    See application file for complete search history.

(56) References Cited

U.S. PATENT DOCUMENTS

| | | | |
|---|---|---|---|
| 6,745,197 B2 | 6/2004 | McDonald | |
| 7,113,943 B2 * | 9/2006 | Bradford | G06F 17/30687 707/739 |
| 7,577,656 B2 | 8/2009 | Kawai et al. | |
| 7,836,054 B2 | 11/2010 | Kawai et al. | |

(Continued)

OTHER PUBLICATIONS

Forman et al.; "Finding similar files in large document repositories"; 11th ACM SIGKDD International Conference on Knowledge Discovery and Data Mining (KDD'05), Aug. 21-25, 2005, Chicago, IL.*

(Continued)

*Primary Examiner* — Eueng-Nan Yeh
(74) *Attorney, Agent, or Firm* — Marshall, Gerstein & Borun LLP; Randall G. Rueth

(57) ABSTRACT

A method for efficiently grouping electronic documents that are likely textual near-duplicates includes processing first and second electronic documents to determine respective sets of character sequence counts. The processing may include, for each document, identifying a plurality of non-contiguous character sequences expressed within the document text, with each character sequence including at least one character from each of at least two different words in the text, and determining character sequence counts for each unique character sequence within the identified character sequences. The method also includes generating one or more similarity metrics, at least by comparing the sets of character sequence counts determined for the first and second electronic documents. The method may also include using the similarity metric(s) to calculate a similarity score, and assigning, based on the similarity score, the second electronic document to a same document group as the first electronic document.

20 Claims, 5 Drawing Sheets

(56) References Cited

U.S. PATENT DOCUMENTS

| | | | |
|---|---|---|---|
| 7,930,306 B2 | 4/2011 | Scholtes et al. | |
| 8,015,124 B2 | 9/2011 | Milo et al. | |
| 8,250,079 B2 | 8/2012 | Scholtes et al. | |
| 8,504,578 B2 | 8/2013 | Scholtes et al. | |
| 8,825,673 B2 | 9/2014 | Ravid et al. | |
| 9,135,252 B2 | 9/2015 | Scholtes et al. | |
| 9,159,584 B2 * | 10/2015 | Lapir | H01L 23/26 |
| 9,245,007 B2 | 1/2016 | Joshi et al. | |
| 9,275,129 B2 | 3/2016 | Desai et al. | |

OTHER PUBLICATIONS

Kimberlee L. Gunning, Esq., "eDiscovery Document Review: Understanding the Key Differences Between Conceptual Searching and Near Duplicate Grouping", 2012, <http://www.equivio.com/files/files/White%20Paper%20-%20Understanding%20the%20Key%20Differences%20Between%20Conceptual%20Searching%20and%20Near%20Duplicate%20Grouping.pdf>, (published before this application Apr. 2016).

Content Analyst Company, "CAAT 3.16 Developer's Guide", Version 1.0, 454 pages, Copyright at 2014. (published before this application Apr. 2016).

* cited by examiner

SYSTEM AND METHOD FOR TEXTUAL NEAR-DUPLICATE GROUPING OF DOCUMENTS

CROSS-REFERENCE TO RELATED APPLICATION

This claims the benefit of U.S. Provisional Patent Application No. 62/309,767, filed on Mar. 17, 2016 and entitled "System and Method for Textual Near-Duplicate Grouping of Documents," the disclosure of which is hereby incorporated herein by reference in its entirety.

FIELD OF THE DISCLOSURE

The present disclosure generally relates to electronic document processing and, more specifically, to processing techniques for efficiently determining whether documents are textual near-duplicates.

BACKGROUND

In various applications, a need exists to identify documents that are duplicates or near-duplicates of one or more other documents in the same document set. In the document review process commonly associated with litigation, for example, identifying and removing duplicate documents can save many hours of attorney time. Techniques that identify and remove exact duplicates within a document database are well known. More recently, techniques for identifying "near-duplicate" documents have been developed. "Near-duplicate" documents are documents that are not (or may not be) exact copies, but have, at most, relatively small differences. Grouping documents that are near-duplicates can help a human reviewer (e.g., an attorney performing document review) to more quickly digest the mass of information that may be present in a large collection of documents. For instance, a large number of documents (e.g., documents held in a company's Sharepoint repository) may more efficiently be reviewed in one sitting, with the reviewer skimming over or ignoring portions that he or she had just reviewed in connection with another document in the same document group.

Near-duplicate grouping may be performed based on the conceptual relatedness of two documents ("conceptual near-duplicate" grouping, e.g., using clustering algorithms), or based on the similarity of the words and word order within two documents ("textual near-duplicate" grouping). In at least some scenarios, textual near-duplicate grouping may be faster than conceptual near-duplicate grouping, and/or may provide more predictable results. Moreover, textual near-duplicate grouping generally produces groups of documents that textually look very much alike, making it simpler to see their relative similarity. To determine the level of similarity between two documents with 100% confidence, a word-by-word comparison generally must be performed. Unfortunately, even if many documents can initially be ruled out based on the similarity threshold and various document characteristics (e.g., document word counts), the word-by-word comparisons for those documents that cannot be ruled out may require unacceptably large amounts of time and/or processing resources. Moreover, while various heuristic techniques, such as determining how many words two documents have in common, have been used to more quickly identify textual near-duplicates, such techniques can be subject to a relatively high rate of false positives. To provide a solution to these problems, innovative processing techniques capable of more accurately and/or quickly identifying textual near-duplicates are needed.

BRIEF SUMMARY

In one aspect, a method for efficiently grouping electronic documents that are likely textual near-duplicates is implemented by one or more processors of a computing system. The method may include processing, by the one or more processors, a first electronic document and a second electronic document to determine respective sets of character sequence counts. Processing the first electronic document and the second electronic document may include, for each electronic document, identifying a plurality of non-contiguous character sequences expressed within text of the electronic document, and determining a set of character sequence counts. Each non-contiguous character sequence may correspond to a different starting word position within the text, and may including (i) a first character at a first pre-defined character position within a word at the corresponding starting word position, and (ii) a second character at a second pre-defined character position within a word that is offset from the corresponding starting word position by a pre-defined number of words. Determining the set of character sequence counts may include determining, for each unique non-contiguous character sequence occurring within the identified plurality of non-contiguous character sequences, a character sequence count specifying how many times the unique non-contiguous character sequence is expressed within the text of the electronic document.

The method may also include generating, by the one or more processors, one or more similarity metrics. Generating the one or more similarity metrics may include comparing (i) the set of character sequence counts determined for the first electronic document to (ii) the set of character sequence counts determined for the second electronic document. The method may also include calculating, by the one or more processors and using the one or more similarity metrics, a similarity score for the first electronic document and the second electronic document, and assigning, by the one or more processors and based on the similarity score, the second electronic document to a same document group as the first electronic document.

In another aspect, a system for efficiently grouping electronic documents that are likely textual near-duplicates includes a first memory storing an electronic document repository containing a plurality of electronic documents, and a computing device comprising one or more processors and a second memory. The second memory stores instructions that, when executed by the one or more processors, may cause the computing device to process a first electronic document and a second electronic document to determine respective sets of character sequence counts, at least in part by, for each electronic document, identifying a plurality of non-contiguous character sequences expressed within text of the electronic document, and determining a set of character sequence counts. Each non-contiguous character sequence may correspond to a different starting word position within the text, and may include (i) a first character at a first pre-defined character position within a word at the corresponding starting word position, and (ii) a second character at a second pre-defined character position within a word that is offset from the corresponding starting word position by a pre-defined number of words. Determining the set of character sequence counts may include determining, for each unique non-contiguous character sequence occurring within the identified plurality of non-contiguous character sequences, a character sequence count specifying how many times the unique non-contiguous character sequence is expressed within the text of the electronic document.

The instructions may also cause the computing device to generate one or more similarity metrics, at least in part by comparing (i) the set of character sequence counts determined for the first electronic document to (ii) the set of character sequence counts determined for the second electronic document. The instructions may also cause the computing device to calculate, using the one or more similarity metrics, a similarity score for the first electronic document and the second electronic document, and assign, based on the similarity score, the second electronic document to a same document group as the first electronic document.

In another aspect, a method for efficiently grouping electronic documents that are likely textual near-duplicates is implemented by one or more processors of a computing system. The method may include processing, by the one or more processors, a first electronic document and a second electronic document to determine respective sets of character sequence counts. Processing the first electronic document and the second electronic document may include, for each electronic document, identifying a plurality of non-contiguous two-character sequences expressed within text of the electronic document, and determining a set of character sequence counts. Each non-contiguous two-character sequence may correspond to a different starting word position within the text, and may consist of (i) a first letter of a word at the corresponding starting word position, and (ii) a first letter of a word that immediately follows the word at the corresponding starting word position. Determining a set of character sequence counts may include determining, for each unique non-contiguous two-character sequence occurring within the identified plurality of non-contiguous two-character sequences, a character sequence count specifying how many times the unique non-contiguous two-character sequence is expressed within the text of the electronic document.

The method may also include generating, by the one or more processors, one or more similarity metrics. Generating the one or more similarity metrics may include comparing (i) the set of character sequence counts determined for the first electronic document to (ii) the set of character sequence counts determined for the second electronic document. The method may also include calculating, by the one or more processors and using the one or more similarity metrics, a similarity score for the first electronic document and the second electronic document, and assigning, by the one or more processors and based on the similarity score, the second electronic document to a same document group as the first electronic document.

DETAILED DESCRIPTION

I. Overview

Figure 1:
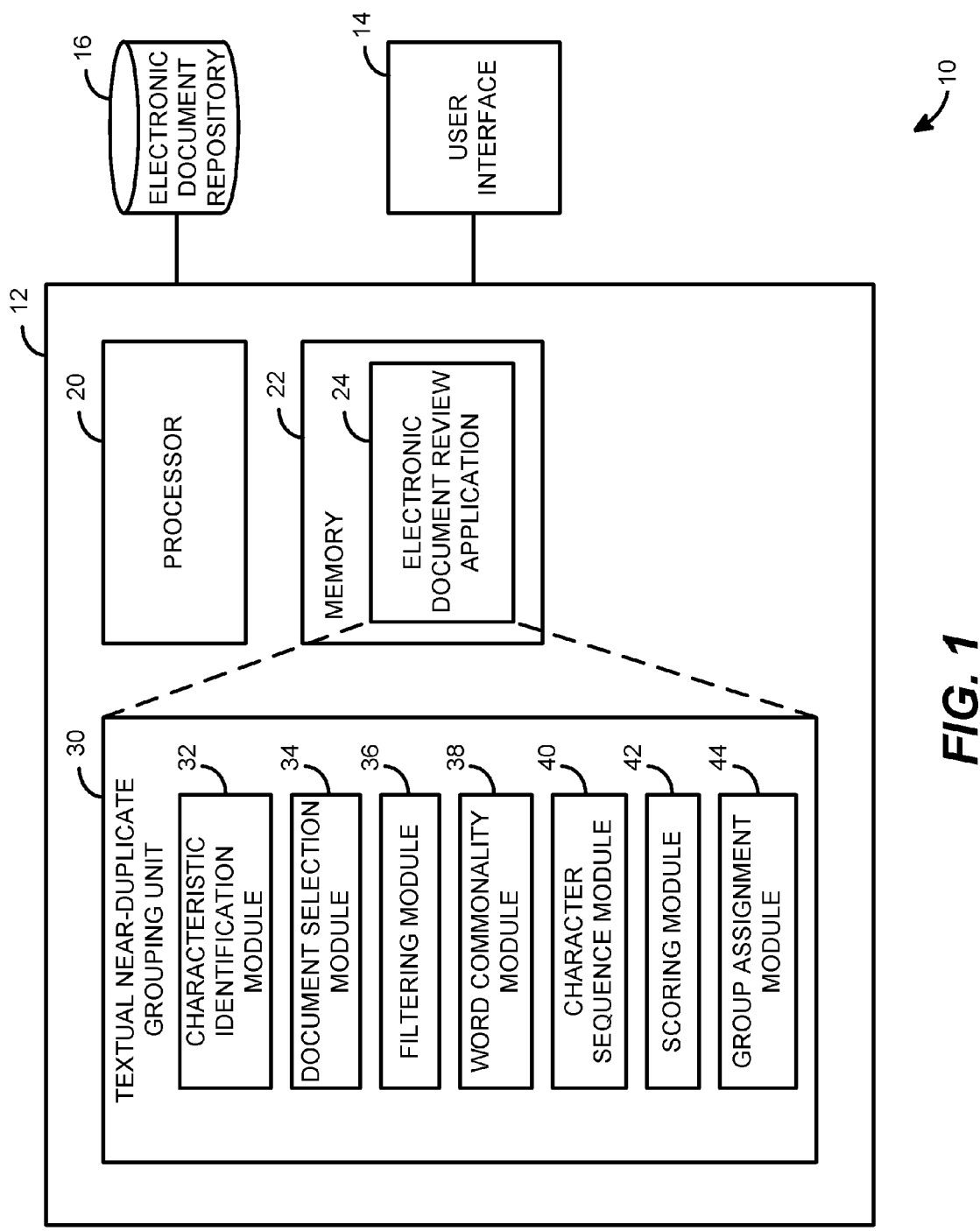
FIG. 1 depicts an example system in which techniques for identifying and grouping likely textual near-duplicates may be implemented, according to one embodiment.

The embodiments described herein relate to, inter alia, the automated identification and grouping of electronic documents. The systems and techniques described herein may be used, for example, in connection with document review tools of the sort commonly used during litigation. However, other applications are also possible. For example, the systems and techniques described herein may be used by a company or other entity to categorize and/or review its own archived documents (e.g., communications received from customers, etc.), and/or for other purposes.

In some embodiments, a textual near-duplicate identification and grouping system compares a number of different electronic documents (e.g., converted or native .pdf and/or .tiff file documents, .doc file documents, .xls file documents, etc.), and determines which documents contain text that is sufficiently similar to justify assigning those documents to a single group. The choice of documents to be compared may be made using any suitable algorithm, such as comparing the largest document remaining in a pool of documents to the next largest document remaining in the pool, for example. Whether the similarity between two documents is sufficient may be dictated by a similarity threshold, such as a minimum percentage similarity that is either pre-determined or selected (e.g., by a user of the system).

Once two documents have been identified for comparison, the system may implement one or more filtering/gating functions to rule out documents that cannot possibly achieve the similarity threshold. The filtering/gating function(s) may require a relatively small amount of processing resources, and may operate by comparing certain easily-ascertained characteristics of the documents being compared (e.g., word counts, Unicode blocks, word lengths, etc.). If, after all applicable filtering/gating functions have been applied, it remains possible that the documents are textual near-duplicates, then one or more additional, heuristic techniques may be applied to determine whether the documents are likely textual near-duplicates. While the heuristic technique(s) may be less certain than full word-by-word comparisons, the technique(s) may provide much greater processing speed/efficiency. With proper design, the number of false positives generated via the heuristic technique(s) may be minimized.

In at least one of the heuristic techniques, the ordering of words within the text of the documents is accounted for in at least some manner. To accomplish this, character sequences that are at least partially non-contiguous, and incorporate characters from multiple different (e.g., neighboring) words, may be identified within each of the compared documents. For example, each character sequence may be two characters long, and consist of the first letter of each of two consecutive words in the text of the document (e.g., the character sequence "ti" for the words "this is"). One such character sequence may be identified for each word within the document or, in some embodiments, for each word in a subset of the words within the document (e.g., only for those words that are followed by at least one more word). Once all character sequences have been identified in the document, a count of how many times each unique character sequence appears within the document may be generated. The character sequences and character sequence counts for the two documents may then be compared, and a similarity score generated based on the comparison. In some embodiments, the results of other heuristic techniques may also be factored into the similarity score. For example, counts of how many times particular words appear in each document may be compared against each other, with higher counts (in both documents) for words generally causing the similarity score to increase.

By replacing conventional processing techniques with one or more of the processing techniques described herein, problems that have in the past plagued the use of textual near-duplicate identification may be overcome. For example, likely textual near-duplicates may be identified and grouped more efficiently (e.g., more quickly and/or using less processing resources). This technical improvement may, in turn, allow various other manual and/or automated tasks (e.g., human review of documents during litigation discovery) to proceed more efficiently and/or effectively.

II. Example System for Identifying and Grouping Likely Textual Near-Duplicates FIG. 1 depicts an example system 10 in which techniques for identifying and grouping likely textual near-duplicates may be implemented, according to one embodiment. As seen in FIG. 1, the example system 10 includes a computing device 12, a user interface 14, and an electronic document repository 16. The computing device 12 may be any suitable type of computing device, such as a desktop computer, laptop computer, server, etc. In some embodiments, the computing device 12 is instead a collection of two or more co-located or geographically distributed computing devices that collectively include the components and/or functions of computing device 12 described below.

User interface 14 may include components that are integral to computing device 12, and/or exterior components that are communicatively coupled to computing device 12. User interface 14 may include software, firmware and/or hardware for one or more input devices, and software, firmware and/or hardware for one or more output devices, to enable user interface 14 to accept inputs from users and present outputs to users. For example, user interface 14 may include a display screen that allows the user to view outputs/displays generated by computing device 12, and may include one or more devices such as a mouse, keyboard, trackball device, digitizing tablet and/or microphone to accept user inputs. In some embodiments, user interface 14 includes one or more integrated input/output devices, such as a touchscreen display. Generally, user interface 14 may enable a user to interact with graphical user interfaces (GUIs) provided by computing device 12. In some embodiments requiring no user interaction (e.g., embodiments where the example system 10 automatically archives data, with textual near-duplicate processing being used to archive groups together), user interface 14 is not included in system 10.

Electronic document repository 16 may be stored in one or more co-located or geographically distributed memories, and may include a number (e.g., thousands, hundreds of thousands, millions, etc.) of electronic documents in one or more formats (e.g., converted or native .pdf and/or .tiff documents, and/or .doc documents, .xls documents, .pst documents, .nsf documents, etc.). Each document may be associated, in electronic document repository 16, with a corresponding document identifier (e.g., a document number or other code, or a file name, etc.). Generally, computing device 12 is configured to obtain documents from electronic document repository 16 as needed.

Computing device 12 includes a processor 20 and a memory 22. While referred to herein in the singular, processor 20 may include any suitable number of processors (e.g., one or more central processing units (CPUs), one or more graphics processing units (GPUs), etc.), and memory 22 may include any suitable number of memories (e.g., one or more persistent memories and/or one or more non-persistent memories). Generally, processor 20 is configured to execute software instructions and applications stored in memory 22. One such application stored in memory 22 is an electronic document review (EDR) application 24.

EDR application 24 generally provides features enabling a user of computing device 12 to manage and review documents stored in electronic document repository 16. For example, EDR application 24 may provide a GUI, presented to the user via user interface 14, that enables the user to select, review and annotate (e.g., tag, mark, add notes to, etc.) individual documents in electronic document repository 16, query the documents in electronic document repository 16 using keywords, and so on. EDR application 24 may be a part of a purchased software package that was provided by a particular company or other entity (e.g., via download over the Internet, etc.), for example.

EDR application 24 may also provide one or more document grouping functions. For example, EDR application 24 may group together documents based on conceptual relatedness (e.g., using clustering algorithms), and/or documents that are exact duplicates. In the embodiment of FIG. 1, one such grouping function of EDR application 24 is provided by a textual near-duplicate (TND) grouping unit 30. As seen in FIG. 1, TND grouping unit 30 includes a characteristic identification module 32, a document selection module 34, a filtering module 36, a word commonality module 38, a character sequence module 40, a scoring module 42 and a group assignment module 44. In some embodiments, TND grouping unit 30 may include more, fewer and/or different modules than those shown in FIG. 1. For example, TND grouping unit 30 may omit word commonality module 38.

Generally, characteristic identification module 32 processes the documents in electronic document repository 16 to identify one or more characteristics of the text in each document. The characteristics determined by characteristic identification module 32 may be stored in electronic document repository 16, memory 22 or another suitable location, and may be associated with the corresponding documents in the storage location.

As one example, characteristic identification module 32 may determine/identify, for each document and for later use by filtering module 36, a total word count, counts of how many letters (and possibly other characters) in the document fall into each Unicode block, statistics relating to the lengths of words in the document (possibly including the distributions of those word lengths within the document), counts of how many words in the document begin with each unique starting letter, and so on. For later use by word commonality module 38, characteristic identification module 32 may, for each document, identify each unique word and determine the number of times each unique word appears in the document.

For later use by character sequence module 40, characteristic identification module 32 may, for each document, identify character sequences that are at least partially non-contiguous and incorporate characters from at least two different words of the document text. For example, each character sequence may be two characters long, and consist of the first letter of each of two consecutive words in the document text (e.g., the character sequence "wa" for the words "what about"). In another example embodiment, each character sequence may be four characters long, and consist of the first two letters of each of two consecutive words in the text of the document (e.g., the character sequence "whab" for the words "what about"). In yet another example embodiment, each character sequence may be three characters long, and consist of the first letter of each of three consecutive words in the text of the document (e.g., the character sequence "wat" for the words "what about this"). In still another example embodiment, each character sequence may be two characters long, and consist of the first letter of each of two words that are separated by one word (e.g., the character sequence "wt" for the words "what about this"). Other techniques are also possible (e.g., taking the second letter from each word, the last letter from each word, etc.). Generally, it is preferable to use relative character and word positions that have been empirically determined to be more predictive of whether any two documents are similar in a textual sense.

For each document, characteristic identification module 32 may identify a non-contiguous character sequence of this sort for multiple words. For example, characteristic identification module 32 may determine the character sequence for the first two words of a document, advance one word and determine the character sequence for the second and third words, advance one more word and determine the character sequence for the third and fourth words, and so on. Characteristic identification module 32 may also determine how many times each unique, non-contiguous character sequence is expressed in each document.

Figure 2:
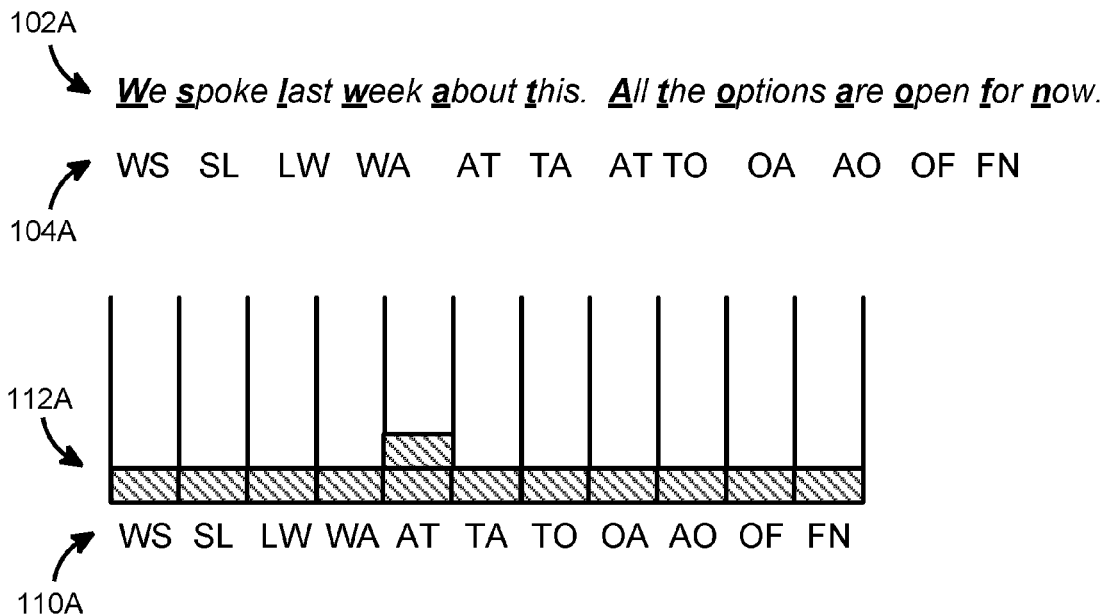
FIG. 2 depicts an example process in which character sequence counts are determined for a pair of electronic documents, according to one embodiment and scenario.
Figure 2:
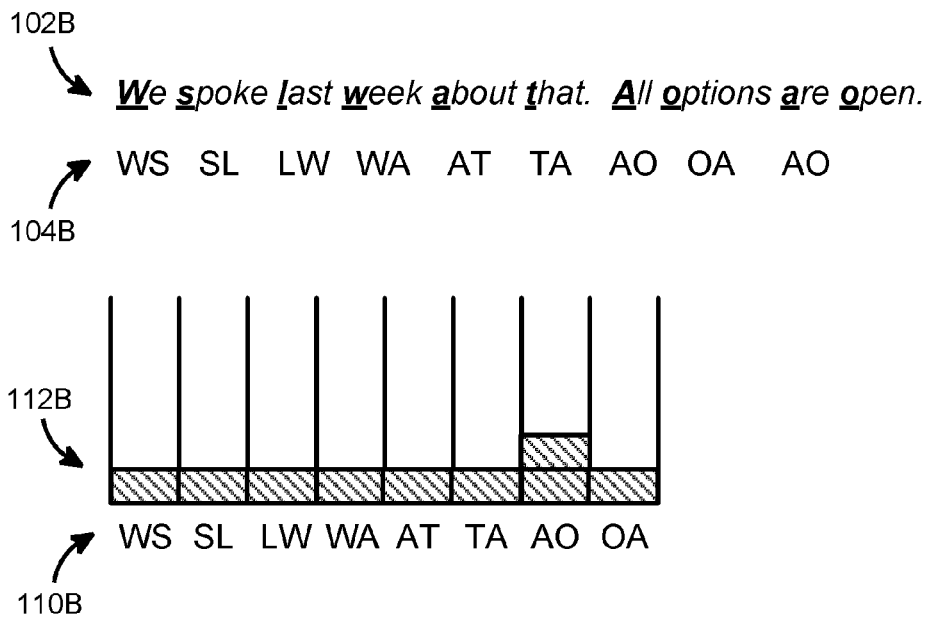

One example of the operation of characteristic identification module 32, in connection with the data gathered for later use by character sequence module 40, is illustrated by the process 100 of FIG. 2. In FIG. 2, a first document includes text 102A, and a second document (e.g., one that may ultimately be compared with the first document) includes text 102B. It is understood, however, that the process 100 may be applied to far more than two documents. In the example process 100, characteristic identification module 32 identifies non-contiguous character sequences 104A within text 102A, and identifies non-contiguous character sequences 104B within text 102B. As seen in FIG. 2, this particular embodiment is one in which each character sequence consists of the first letters of two consecutive words, in the same order as the corresponding words. Non-contiguous character sequences 104A and 104B reduce to sets 110A and 110B, respectively, of unique character sequences. In addition to identifying the unique character sequence sets 110A and 110B, characteristic identification module 32 may determine a count 112A of each character sequence in set 110A and a count 112B of each character sequence in set 110B.

In some embodiments (e.g., the embodiment corresponding to FIG. 2), characteristic identification module 32 ignores the case of letters. In other embodiments, however, the case is taken into account (e.g., such that "WS" and "SL" in the non-contiguous character sequences 104A are instead "Ws" and "sl"). Likewise, different embodiments may account for or ignore punctuation, spaces and/or ends of sentences or paragraphs. In one embodiment where characteristic identification module 32 accounts for the ends of sentences, for example, the non-contiguous character sequence 104A is instead "WS SL LW AT T<n> <n>A AT TO OA AO OF FN N<n>," where "<n>" is a null character representing the end of a sentence (e.g., a period, question mark or exclamation mark).

The timing with which characteristic identification module 32 processes the documents to determine the document characteristics may vary according to different embodiments. For example, characteristic identification module 32 may process each document as the document is added to electronic document repository 16, or may periodically perform batch processing on any documents in electronic document repository 16 for which characteristics have not yet been identified or determined. In other embodiments, characteristic identification module 32 processes documents only after those documents have been selected for comparison/grouping by document selection module 34 in the manner discussed below.

Document selection module 34 generally selects pairs of documents that are to be compared to determine whether the two documents are likely textual near-duplicates. In some embodiments, document selection module 34 selects documents by identifying an initial pool of documents (e.g., a pool of documents that were previously obtained from electronic document repository 16), selecting the largest (e.g., highest word count) document in the pool as a "primary" document for a group, and then selecting the next largest document in the pool as the document for comparison with the primary document. On a subsequent iteration, the next largest document remaining in the pool (after the two previously-selected documents have been removed from the pool) may be selected for comparison with the primary document. The selection process is described in more detail below in connection with FIG. 4, according to one example embodiment.

Filtering module 36 may use some or all of the document characteristics that were identified by characteristic identification module 32 to perform one or more filtering/gating functions. The filtering functions generally serve to rule out documents that have been selected by document selection module 34, but cannot possibly meet one or more similarity criteria for being considered a textual near-duplicate (e.g., a percentage similarity threshold that was set by a user via user interface 14).

In one example embodiment, filtering module 36 compares word counts of the documents selected by document selection module 34. If a similarity threshold is set at 80%, for example (e.g., the words and word order of the two documents have at least 80% in common according to one or more criteria), then filtering module 36 may determine that it is impossible for a document having only 19 words to meet the similarity threshold when compared to a document having 100 words. That is, filtering module 36 may recognize that, even if the smaller document included 19 words from the larger document, and even if those words appear in the same order as the words in the larger document, the similarity threshold still cannot possibly be met.

Filtering module 36 may also, or instead, compare the Unicode block(s) into which the characters of the two selected documents fall, and rule out the documents as textual near-duplicates if the block distributions are sufficiently different. Filtering module 36 may also, or instead, compare the distributions of the lengths of the words in the two documents, and rule out the documents as textual near-duplicates if the distributions of the word lengths within the documents are sufficiently different. Filtering module 36 may also, or instead, compare the first characters of all words in each of the two documents, and rule out the documents as textual near-duplicates if the distributions of first characters are sufficiently different. In other embodiments, other filtering functions may be implemented by filtering module 36. In some embodiments, to save processing resources, the stages/functions of filtering module 36 are arranged sequentially, and each successive stage or function is only executed if the previous stage or function did not rule out the documents as textual near-duplicates.

In some embodiments, one or more filtering functions are performed prior to, or as a part of, document selection by document selection module 34. In one embodiment, for example, the documents in electronic document repository 16 are pre-ordered by word count, and document selection module 34 only selects documents for comparison if the word counts and the similarity criteria indicate that a textual near-duplicate is a possibility.

The operations of filtering module 36 may generally be less processing-intensive than the later processing operations of word commonality module 36, character sequence module 38 and/or scoring module 40. Thus, by triggering the processing of word commonality module 38, character sequence module 40 and scoring module 42 if and only if filtering module 36 does not rule out the two selected documents as potential textual near-duplicates, unnecessary expenditures of processing resources may be avoided.

Word commonality module 38 applies a first heuristic stage that generally looks at the number of words in common between the two selected documents, and the degree to which those common words are used in both documents. To this end, word commonality module 38 may analyze data previously generated by characteristic identification module 32. For example, word commonality module 38 may compare the unique words and unique word counts for the two documents under comparison that were previously identified/determined by characteristic identification unit 32 for the two documents. Based on this comparison, word commonality module 38 may generate/calculate a set of one or more metrics. As just one example, word commonality module 38 may calculate metrics that reflect, for each common word, the number of times that the word appears in each document, and/or the minimum of those two numbers (e.g., min(X,Y), where the word appears X times in one document and Y times in the other), etc. Other types of metrics may also, or instead, be generated based on the characteristics identified/determined by characteristic identification module 32 for the two documents. The metric(s) generated by word commonality module 38 may be used in the calculation of a similarity score, as discussed further below in connection with scoring module 42.

Character sequence module 40 applies a second heuristic stage that generally takes the ordering of the words within the two selected documents into account. Similar to word commonality module 38, character sequence module 40 may accomplish its task by analyzing data previously generated by characteristic identification module 32. For example, character sequence module 40 may compare the unique non-contiguous character sequences, and the counts of those non-contiguous character sequences, that were previously identified/determined by characteristic identification module 32 for the two documents. Based on this comparison, character sequence module 40 may generate/calculate a set of one or more metrics. As just one example, character sequence module 40 may calculate metrics that reflect, for each non-contiguous character sequence common to both documents, the number of times the character sequence appears in both documents, and/or the minimum of those two numbers (e.g., min(X,Y), where the character sequence is expressed X times in one document and Y times in the other). In the scenario of FIG. 2, for example, where each character sequence in set 110A has a count of "one" except for the sequence "AT" (having a count of "two"), and where each character sequence in set 110B has a count of "one" except for the sequence "AO" (having a count of "two"), the set of min(X,Y) values for the shared character sequences {WS, SL, LW, WA, AT, TA, OA, AO} is {1, 1, 1, 1, 1, 1, 1, 1}. Other types of metrics may also, or instead, be generated based on the characteristics identified by characteristic identification module 32 for the two documents. The metric(s) generated by character sequence module 40 may be used in the calculation of a similarity score, as discussed further below in connection with scoring module 42.

Scoring module 42 may generally use one or more metrics generated by word commonality module 38 and character sequence module 40 to calculate a similarity score for the two selected documents. The similarity score may predict or estimate the degree of similarity between the two documents. As just one example, scoring module 42 may use metrics from word commonality module 38 to calculate, for each word that is present in both documents, a ratio R of the number of times the word is present in one document (e.g., the document in which that particular word appears more times) to the number of times the word is present in the other document. For instance, if one document includes 22 instances of "john" and 10 instances of "account," and the other document includes 14 instances of "john" and 11 instances of "account," scoring module 42 may calculate a ratio $R_1$ of 14/22=0.64 for the word "john" and a ratio $R_2$ of 10/11=0.91 for the word "account." Scoring module 42 may then add all of the calculated ratios to the similarity score, for example.

Scoring module 42 may also, or instead, use one or more metrics from character sequence module 40 to calculate the similarity score. For example, for each non-contiguous character sequence expressed in both documents, the value of min(X,Y) (as discussed above in connection with character sequence module 40) may be added to the score. In the embodiment and scenario of FIG. 2, for instance, the fact that eight character sequences are shared by sets 110A and 110B, with each having a min(X,Y) value of 1, may result in a score or sub-score of 1+1+1+1+1+1+1+1=8. If, for example, the character sequence "WS" were instead expressed twice in one document and three times in the other, then a score or sub-score of min(4,3)+1+1+1+1+1+1+1=10 would result. It is understood that the scoring algorithms described above are merely illustrative, and that any other suitable scoring algorithm(s) may be used, and/or the scoring algorithm(s) may operate on any other suitable metric(s) generated by word commonality module 38 and/or character sequence module 40. In some embodiments, the scoring algorithm operates solely on metrics generated by character sequence module 40.

Group assignment module 44 may compare the similarity score against a threshold score. The threshold score may be one that a user selected via user interface 14, for example, or a default threshold score, etc. In various different embodiments, the threshold score may be the same number (e.g., minimum percent similarity) that was used by filtering module 36 to rule out certain documents from the field of potential textual near-duplicates, or may be a different type of score not used by filtering module 36.

If the similarity score exceeds the threshold score, group assignment module 44 may assign the two documents to the same group. In an embodiment where a shorter, "secondary" document is compared to a longer, "primary" document, for example, the secondary document may be added to a group that is associated with the primary document (e.g., a group labeled with an identifier of the primary document). If the similarity score does not exceed the threshold score, the secondary document may not be added to the group. In some embodiments, the secondary document is instead designated as a new "primary" document for a new group and a new set of comparisons with other, still shorter documents (e.g., as discussed below in connection with FIG. 4).

While FIG. 1 depicts a system 10 in which the EDR application 24, including TND grouping unit 30, executes entirely on computing device 12, other implementations are also possible. For example, computing device 12 may be a client device executing a web browser application stored in memory 22, and at least the TND grouping unit 30 of EDR application 24 may execute on a remote server accessed by the computing device 12 via one or more networks, including the Internet. In such an embodiment, electronic document repository 16 may also be remote form computing device 12, and may be accessible by the remote server.

Figure 3:
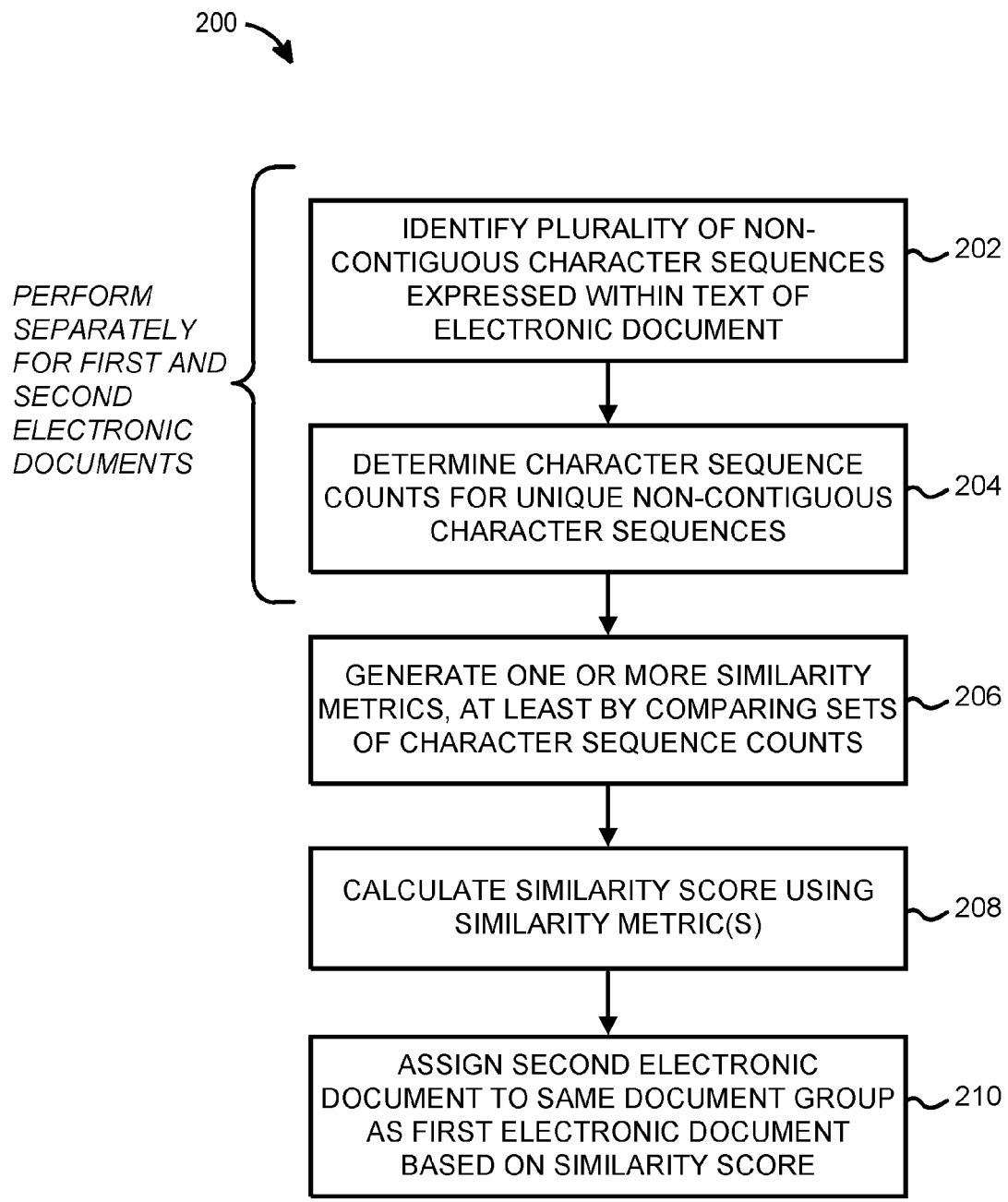
FIG. 3 depicts a flow diagram of an example method for efficiently grouping electronic documents that are likely textual near-duplicates, according to one embodiment.

III. Example Methods for Identifying and Grouping Likely Textual Near-Duplicates FIG. 3 depicts a flow diagram of an example method 200 for efficiently grouping electronic documents that are likely textual near-duplicates, according to one embodiment. The method 200 may be implemented by one or more processors of one or more computing devices, such as processor 20 of computing device 12 of FIG. 1, for example.

In the example method 200, blocks 202 and 204 are collectively repeated for each of a first and second electronic document, either sequentially or in parallel. Generally, in blocks 202 and 204, the electronic documents are processed to determine respective sets of character sequence counts. More specifically, for each document within the pair, a plurality of non-contiguous character sequences, expressed within the text of the document, may be identified (block 202), and a set of character sequence counts may be determined (block 204).

Each non-contiguous character sequence identified at block 202 corresponds to a different starting word position within the text of the electronic document, and includes at least two characters: a first character at a first pre-defined character position within a word at the corresponding starting word position (e.g., a first letter of that word, or the last letter, etc.), and a second character at a second pre-defined character position within a word that is offset from the corresponding starting word position (e.g., a first letter of the offset word, or the last letter, etc.). Each different starting word position may be the next word in a contiguous sequence of words within the document text, for example. The offset between the words in which the first and second characters are found may be one word (if adjacent/consecutive words are used), or more than one word, in various different embodiments. In some embodiments, the non-contiguous character sequence also includes at least a third character, which may be adjacent the first character, adjacent the second character, or non-contiguous with respect to both the first and second characters (e.g., a first letter of a third word that is offset from both the word in which the first character was located and the word in which the second character was located).

The set of character sequence counts determined at block 204 may include one count for each unique character sequence in the plurality of non-contiguous character sequences identified at block 202, and may specify the number of times the corresponding unique character sequence is expressed within the text of the electronic document. The character sequence counts may be similar to those shown in FIG. 2, for example.

Also in the method 200, one or more similarity metrics are generated (block 206), at least by comparing the two sets of character sequence counts generated in the two iterations of block 204 (i.e., one iteration for each electronic document). For example, a metric equal to min(X,Y) may be generated for each character sequence that is common to both sets, with X being the number of times the character sequence is expressed in the first electronic document and Y being the number of times the character sequence is expressed in the second electronic document.

A similarity score for the first electronic document and the second electronic document is calculated using the similarity metric(s) generated at block 206 (block 208). Any suitable scoring algorithm may be used, including any of the scoring algorithms described above in connection with scoring module 42 of FIG. 1, for example.

The method 200 shown in FIG. 3 corresponds to a scenario in which the two documents are likely textual near-duplicates. Thus, based on the similarity score calculated at block 208, the second electronic document is assigned to the same document group as the first electronic document (block 210). For example, it may be determined at block 210 that the similarity score is greater than a selected or pre-determined threshold score, and the second electronic document may be assigned to the same document group as the first electronic document in response to that determination. In other scenarios not reflected by the method 200 of FIG. 3 (e.g., if the similarity score is not above the threshold score), the second electronic document may not be assigned to the same document group as the first electronic document.

In some embodiments, block 210 includes generating or modifying metadata associated with the first and/or second electronic documents (e.g., metadata stored in electronic document repository 16 of FIG. 1). Additionally or alternatively, block 210 may include causing a user interface of either the computing system (e.g., user interface 14 of FIG. 1) or a remote client device to display information indicating that the second electronic document is assigned to the same document group as the first electronic document. For example, the user interface may present a GUI (e.g., a GUI provided by EDR application 24 of FIG. 1) that displays lists of grouped documents to the user (e.g., via user interface 14 of FIG. 1), with the first and second electronic documents being included in the same list, and the user may then select any documents from the group for more detailed review (e.g., via the same GUI).

It is understood that the order of the blocks shown in FIG. 3 does not, in some embodiments, strictly reflect the timing of the corresponding operations. Moreover, in some embodiments, the method 200 may include one or more additional blocks not shown in FIG. 3. For example, the method 200 may also include determining one or more additional similarity metrics indicating commonality of words between the first and second electronic documents, and the similarity score may be calculated at block 208 using the additional similarity metric(s) as well as the similarity metric(s) generated at block 206. As another example, the method 200 may include additional blocks similar to blocks 206, 208 and 210, but for a comparison between the first electronic document and a different, third electronic document. As yet another example, the method 200 may include additional blocks in which filtering operations are performed on both electronic documents (e.g., operations similar to those discussed above in connection with characteristic identification module 32 and filtering module 36 of FIG. 1), such as determining sets of document text characteristics and using those characteristics to determine whether the documents are logically excluded from satisfying one or more similarity criteria. In such an embodiment, the electronic documents may be processed at blocks 202 and 204 in response to determining that the first and second electronic documents are not logically excluded from satisfying the one or more similarity criteria, for example.

Figure 4:
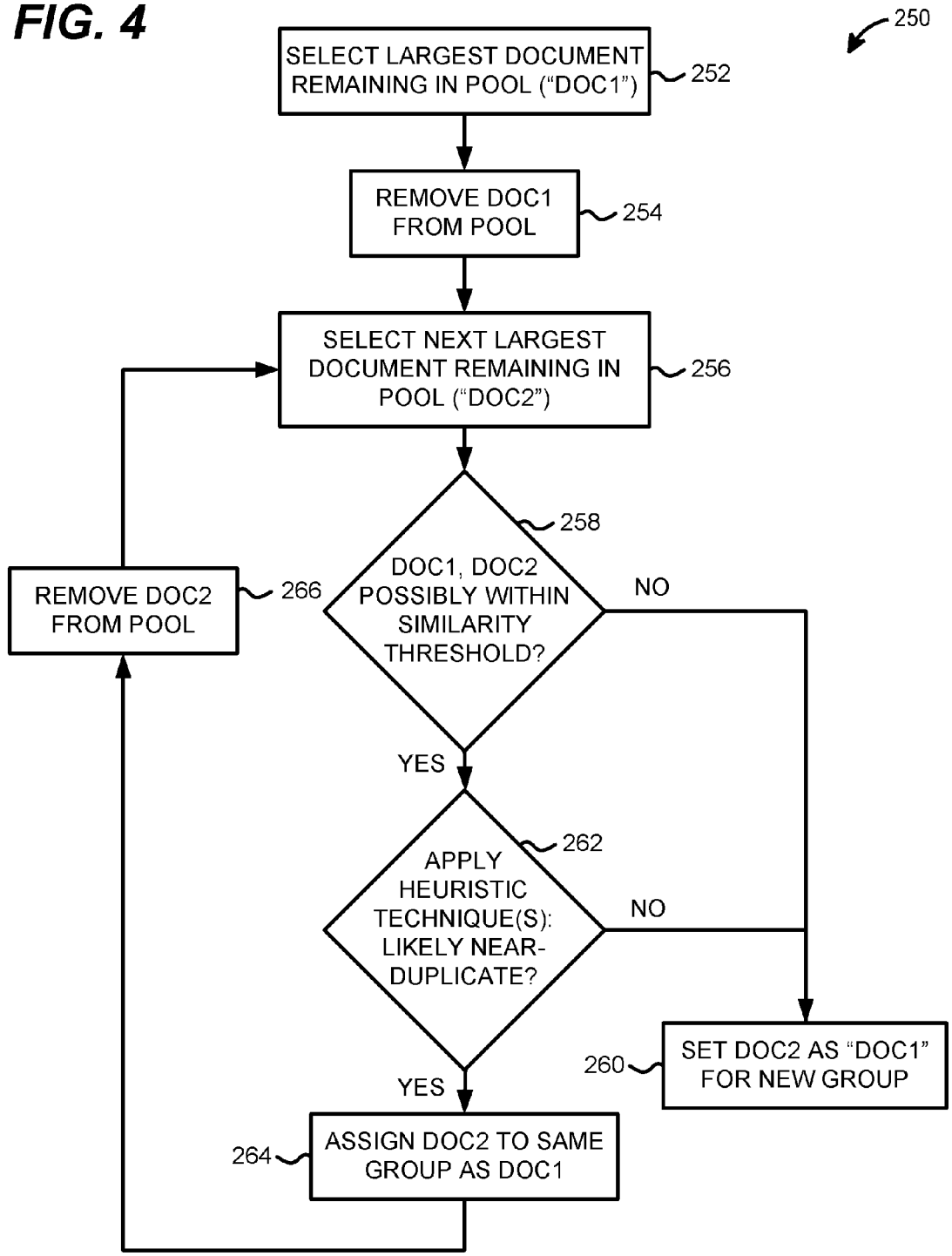
FIG. 4 depicts an example process flow in which the method of FIG. 3 may be implemented, according to one embodiment.

FIG. 4 depicts an example process flow 250 in which the method 200 of FIG. 3 may be implemented, according to one embodiment. In other embodiments, however, the method 200 may occur within a different process flow. The process flow 250 may be implemented by one or more processors of one or more computing devices, such as processor 20 of computing device 12 of FIG. 1, for example.

In a processing stage 252, the largest document remaining in a pool of documents (e.g., all documents, or a subset of documents, in electronic document repository 16 of FIG. 1) is selected as a "primary" document ("DOC1"). Thereafter, at processing stage 254, the primary document may be removed from the pool of documents such that it cannot be selected for further comparisons. At processing stage 256, the next largest document remaining in the pool is selected as a "secondary" document ("DOC2"). At processing stage 258, it is determined whether the primary and secondary documents can possibly be within a pre-determined or selected similarity threshold (e.g., 80% similarity, 50% similarity, etc.). Processing stage 258 may include functionality similar to that of filtering module 36 of FIG. 1, for example.

If it is determined at processing stage 258 that the primary and secondary documents cannot possibly be within the similarity threshold, flow proceeds to processing stage 260, where the secondary document may be designated as the primary document ("DOC1") for a new group or potential group. For example, the process flow 250 may be repeated, but with "DOC2" being set as "DOC1" at processing stage 252. While not shown in FIG. 4, the process of identifying likely textual near-duplicates may also continue for the original primary document, but with the original secondary document being removed from that pool.

If it is instead determined at processing stage 258 that the primary and secondary documents could possibly be within the similarity threshold, flow proceeds to processing stage 262. At processing stage 262, one or more heuristic techniques are applied to determine whether it is likely that the primary and secondary documents are textual near-duplicates. Processing stage 262 may include the functionality of some or all of blocks 202 through 208 of the method 200, and/or the functionality of word commonality module 38, character sequence module 40 and scoring module 42 of FIG. 1, for example.

If it is determined at processing stage 262 that the primary and secondary documents are not likely textual near-duplicates (e.g., due to a similarity score falling short of a threshold score), flow proceeds to processing stage 260, where the secondary document is set to be the primary document ("DOC1") for a new group or potential group as discussed above. If it is instead determined at processing stage 262 that the primary and secondary documents are likely textual near-duplicates (e.g., due to a similarity score exceeding a threshold score), flow proceeds to processing stage 264. At processing stage 264, the secondary document is assigned to the same group as the primary document. At processing stage 266, the secondary document is removed from the pool, after which flow proceeds back to processing stage 256 to select the next largest document remaining in the pool as a new secondary document for another comparison.

It is understood that, in some embodiments, the process flow 250 may include more, fewer and/or different processing stages than those shown in FIG. 4, and/or the processing stages may occur in a different order. For example, processing stage 254 may occur after processing stage 264 and/or processing stage 266, and/or processing stage 266 may occur immediately after processing stage 252, etc.

Figure 5:
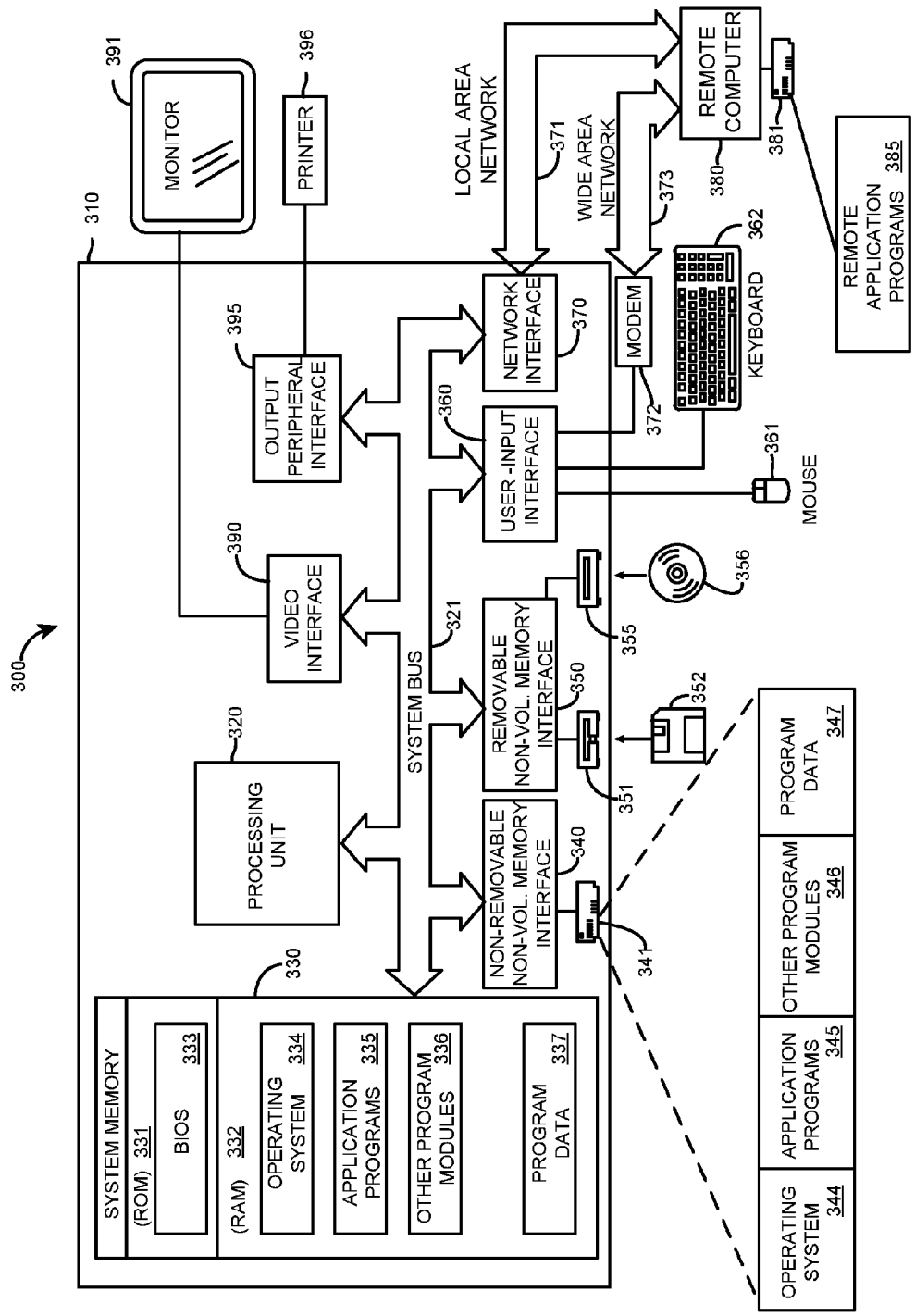
FIG. 5 depicts an example computer system in which the techniques described herein may be implemented, according to one embodiment.

IV. Example Computer System for Identification and Grouping of Likely Textual Near-Duplicates FIG. 5 depicts an example computer system 300 in which the techniques described herein may be implemented, according to an embodiment. The computer system 300 of FIG. 5 may include a computing device in the form of a computer 310. Components of the computer 310 may include, but are not limited to, a processing unit 320, a system memory 330, and a system bus 321 that couples various system components including the system memory 330 to the processing unit 320. The system bus 321 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 310 may include a variety of computer-readable media. Computer-readable media may be any available media that can be accessed by computer 310 and may include both volatile and nonvolatile media, and both removable and non-removable media. By way of example, and not limitation, computer-readable media may comprise computer storage media and communication media. Computer storage media may include volatile and nonvolatile, removable and non-removable media implemented in any method or technology for storage of information such as computer-readable instructions, data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310.

Communication media typically embodies computer-readable instructions, data structures, program modules or other data in a modulated data signal such as a carrier wave or other transport mechanism, and may include any information delivery media. The term "modulated data signal" means a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared and other wireless media. Combinations of any of the above are also included within the scope of computer-readable media.

The system memory 330 may include computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to, and/or presently being operated on, by processing unit 320. By way of example, and not limitation, FIG. 5 illustrates operating system 334, application programs 335, other program modules 336, and program data 337.

The computer 310 may also include other removable/non-removable, volatile/nonvolatile computer storage media. By way of example only, FIG. 5 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 may be connected to the system bus 321 through a non-removable memory interface such as interface 340, and magnetic disk drive 351 and optical disk drive 355 may be connected to the system bus 321 by a removable memory interface, such as interface 350.

The drives and their associated computer storage media discussed above and illustrated in FIG. 5 provide storage of computer-readable instructions, data structures, program modules and other data for the computer 310. In FIG. 5, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as cursor control device 361 (e.g., a mouse, trackball, touch pad, etc.) and keyboard 362. A monitor 391 or other type of display device is also connected to the system bus 321 via an interface, such as a video interface 390. In addition to the monitor, computers may also include other peripheral output devices such as printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and may include many or all of the elements described above relative to the computer 310, although only a memory storage device 381 has been illustrated in FIG. 5. The logical connections depicted in FIG. 5 include a local area network (LAN) 371 and a wide area network (WAN) 373, but may also include other networks. Such networking environments are commonplace in hospitals, offices, enterprise-wide computer networks, intranets and the Internet.

When used in a LAN networking environment, the computer 310 is connected to the LAN 371 through a network interface or adapter 370. When used in a WAN networking environment, the computer 310 may include a modem 372 or other means for establishing communications over the WAN 373, such as the Internet. The modem 372, which may be internal or external, may be connected to the system bus 321 via the input interface 360, or other appropriate mechanism. The communications connections 370, 372, which allow the device to communicate with other devices, are an example of communication media, as discussed above. In a networked environment, program modules depicted relative to the computer 310, or portions thereof, may be stored in the remote memory storage device 381. By way of example, and not limitation, FIG. 5 illustrates remote application programs 385 as residing on memory device 381.

The techniques for identification and grouping of likely textual near-duplicates described above may be implemented in part or in their entirety within a computer system such as the computer system 300 illustrated in FIG. 5. The computer 310 may be the computing device 12 of FIG. 1, for example, and the remote application programs 385 may include the EDR application 24 of FIG. 1. Moreover, electronic document repository 16 of FIG. 1 may be stored in hard disk drive 341 (e.g., as program data 347), magnetic disk 352 and/or optical disk drive 355. In other embodiments, the computer 310 may be a client device that is used to access user-facing features of EDR application 24 (e.g., to view likely textual near-duplicate groupings of documents, to select and review documents from among the groups, etc.), the remote computer 380 may be a server, EDR application 24 of FIG. 1 may be included in remote application programs 385, and/or electronic document repository 16 of FIG. 1 may be stored in the remote memory storage device 381 or another remote storage location.

V. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for identifying and grouping likely textual near-duplicates through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. §112(f) unless traditional means-plus-function language is expressly recited, such as "means for" or "step for" language being explicitly recited in the claim(s).

What is claimed:

1. A method, implemented by one or more processors of a computing system, for efficiently grouping electronic documents that are likely textual near-duplicates, the method comprising:
   processing, by the one or more processors, a first electronic document and a second electronic document to determine respective sets of character sequence counts, wherein processing the first electronic document and the second electronic document includes, for each electronic document,
      identifying a plurality of non-contiguous character sequences expressed within text of the electronic document, each non-contiguous character sequence corresponding to a different starting word position within the text and including (i) a first character at a first pre-defined character position within a word at the corresponding starting word position, and (ii) a second character at a second pre-defined character position within a word that is offset from the corresponding starting word position by a pre-defined number of words, and
      determining a set of character sequence counts, at least in part by determining, for each unique non-contiguous character sequence occurring within the identified plurality of non-contiguous character sequences, a character sequence count specifying how many times the unique non-contiguous character sequence is expressed within the text of the electronic document;
   generating, by the one or more processors, one or more similarity metrics, wherein generating the one or more similarity metrics includes comparing (i) the set of character sequence counts determined for the first electronic document to (ii) the set of character sequence counts determined for the second electronic document;
   calculating, by the one or more processors and using the one or more similarity metrics, a similarity score for the first electronic document and the second electronic document; and
   assigning, by the one or more processors and based on the similarity score, the second electronic document to a same document group as the first electronic document.

2. The method of claim 1, wherein assigning the second electronic document to the same document group as the first electronic document includes causing a user interface of either the computing system or a remote client device to display information indicating that the second electronic document is assigned to the same document group as the first electronic document.

3. The method of claim 1, wherein:
   the first pre-defined character position within the word at the corresponding starting word position is a first letter of the word at the corresponding starting word position; and
   the second pre-defined character position within the word that is offset from the corresponding starting word position by the pre-defined number of words is a first letter of the word that is offset from the corresponding starting word position.

4. The method of claim 3, wherein the second pre-defined character position within the word that is offset from the corresponding starting word position by the pre-defined number of words is a first letter of a word that immediately follows the word at the corresponding starting word position.

5. The method of claim 3, wherein the different starting word positions include positions of a contiguous sequence of words within the text of the electronic document.

6. The method of claim 1, wherein each of the plurality of non-contiguous character sequences consists of two characters.

7. The method of claim 1, further comprising:
   determining, by the one or more processors, one or more additional similarity metrics indicating commonality of words between the first electronic document and the second electronic document,
   wherein calculating the similarity score includes calculating the similarity score using (i) the one or more similarity metrics and (ii) the one or more additional similarity metrics.

8. The method of claim 1, wherein assigning the second electronic document to the same document group as the first electronic document includes:
   determining that the similarity score is greater than a threshold score; and
   in response to determining that the similarity score is greater than the threshold score, assigning the second electronic document to the same document group as the first electronic document.

9. The method of claim 1, further comprising:
   generating, by the one or more processors, an additional one or more similarity metrics, wherein generating the additional one or more similarity metrics includes comparing (i) the set of character sequence counts determined for the first electronic document to (ii) the set of character sequence counts determined for a third electronic document of the plurality of electronic documents; and
   calculating, by the one or more processors and using the additional one or more similarity metrics, a new similarity score for the first electronic document and the third electronic document; and not assigning, by the one or more processors and based on the new similarity score, the third electronic document to the same document group as the first electronic document.

10. The method of claim 1, further comprising, prior to processing the first electronic document and the second electronic document to determine the respective sets of character sequence counts:

determining, by the one or more processors, a first set of one or more characteristics of the text of the first electronic document;

determining, by the one or more processors, a second set of one or more characteristics of the text of the second electronic document; and determining, by the one or more processors and using the first set of one or more characteristics and the second set of one or more characteristics, that the first electronic document and the second electronic document are not logically excluded from satisfying one or more similarity criteria, wherein processing the first electronic document and the second electronic document to determine the respective sets of character sequence counts is performed in response to determining that the first electronic document and the second electronic document are not logically excluded from satisfying the one or more similarity criteria.

11. The method of claim 10, wherein the first set of one or more characteristics and the second set of one or more characteristics include one or more of: (i) word count information for the texts of the respective electronic documents, (ii) unicode block information for the texts of the respective electronic documents, (iii) word length information for the texts of the respective electronic documents, or (iv) information about a first letter of each word for the texts of the respective documents.

12. A system for efficiently grouping electronic documents that are likely textual near-duplicates, the system comprising:

a first memory storing an electronic document repository containing a plurality of electronic documents, including a first electronic document and a second electronic document;

a computing device comprising one or more processors and a second memory, the second memory storing instructions that, when executed by the one or more processors, cause the computing device to obtain electronic documents stored in the first memory to process the first electronic document and the second electronic document to determine respective sets of character sequence counts, at least in part by, for each electronic document, (a) identifying a plurality of non-contiguous character sequences expressed within text of the electronic document, each non-contiguous character sequence corresponding to a different starting word position within the text and including (i) a first character at a first pre-defined character position within a word at the corresponding starting word position, and (ii) a second character at a second pre-defined character position within a word that is offset from the corresponding starting word position by a pre-defined number of words, and (b) determining a set of character sequence counts, at least in part by determining, for each unique non-contiguous character sequence occurring within the identified plurality of non-contiguous character sequences, a character sequence count specifying how many times the unique non-contiguous character sequence is expressed within the text of the electronic document, generate one or more similarity metrics, at least in part by comparing (i) the set of character sequence counts determined for the first electronic document to (ii) the set of character sequence counts determined for the second electronic document, calculate, using the one or more similarity metrics, a similarity score for the first electronic document and the second electronic document, and assign, based on the similarity score, the second electronic document to a same document group as the first electronic document.

13. The system of claim 12, wherein:

the first pre-defined character position within the word at the corresponding starting word position is a first letter of the word at the corresponding starting word position; and the second pre-defined character position within the word that is offset from the corresponding starting word position by the pre-defined number of words is a first letter of the word that is offset from the corresponding starting word position.

14. The system of claim 13, wherein the second pre-defined character position within the word that is offset from the corresponding starting word position by the pre-defined number of words is a first letter of a word that immediately follows the word at the corresponding starting word position.

15. The system of claim 13, wherein the different starting word positions include positions of a contiguous sequence of words within the text of the electronic document.

16. The system of claim 12, wherein each of the plurality of non-contiguous character sequences consists of two characters.

17. The system of claim 12, wherein:

the instructions, when executed by the one or more processors, further cause the computing device to determine one or more additional similarity metrics indicating commonality of words between the first electronic document and the second electronic document; and the similarity score is calculated using (i) the one or more similarity metrics and (ii) the one or more additional similarity metrics.

18. The system of claim 12, further comprising a user interface, wherein the instructions further cause the user interface to display information indicating that the second electronic document is assigned to the same document group as the first electronic document.

19. A method, implemented by one or more processors of a computing system, for efficiently grouping electronic documents that are likely textual near-duplicates, the method comprising:

processing, by the one or more processors, a first electronic document and a second electronic document to determine respective sets of character sequence counts, wherein processing the first electronic document and the second electronic document includes, for each electronic document, identifying a plurality of non-contiguous two-character sequences expressed within text of the electronic document, each non-contiguous two-character sequence corresponding to a different starting word position within the text and consisting of (i) a first letter of a word at the corresponding starting word position, and (ii) a first letter of a word that immediately follows the word at the corresponding starting word position, and determining a set of character sequence counts, at least in part by determining, for each unique non-contiguous two-character sequence occurring within the identified plurality of non-contiguous two-character sequences, a character sequence count specifying how many times the unique non-contiguous two-character sequence is expressed within the text of the electronic document;

generating, by the one or more processors, one or more similarity metrics, wherein generating the one or more similarity metrics includes comparing (i) the set of character sequence counts determined for the first electronic document to (ii) the set of character sequence counts determined for the second electronic document;

calculating, by the one or more processors and using the one or more similarity metrics, a similarity score for the first electronic document and the second electronic document; and assigning, by the one or more processors and based on the similarity score, the second electronic document to a same document group as the first electronic document.

20. The method of claim 19, wherein the different starting word positions include positions of a contiguous sequence of words within the text of the electronic document.

\* \* \* \* \*